(12) United States Patent
Ghosh et al.

(10) Patent No.: US 7,042,250 B1
(45) Date of Patent: May 9, 2006

(54) SYNCHRONIZATION OF CLOCK SIGNALS IN A MULTI-CLOCK DOMAIN

(75) Inventors: Pranab Ghosh, Bangalore (IN); Amitabha Banerjee, Bangalore (IN); Sanchayan Sinha, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 62 days.

(21) Appl. No.: 10/904,297

(22) Filed: Nov. 3, 2004

(51) Int. Cl.
*H03K 19/00* (2006.01)
(52) U.S. Cl. .................... 326/93; 326/94; 326/96; 327/141
(58) Field of Classification Search ............ 326/93–94, 326/96; 327/141, 144, 146, 155
See application file for complete search history.

(56) References Cited

U.S. PATENT DOCUMENTS

2003/0107407 A1* 6/2003 Aikawa ...................... 326/93

* cited by examiner

*Primary Examiner*—Anh Q. Tran
(74) *Attorney, Agent, or Firm*—Alan K. Stewart; W. James Brady, III; Frederick J. Telecky, Jr.

(57) ABSTRACT

A synchronizer circuit which synchronizes an input clock signal to a sampling clock to generate a synchronized signal. In an embodiment, an adaptive module detects the occurrence of a positive edge in an input clock signal after a logic low corresponding to a prior negative edge is propagated to as a synchronized signal, and provides a logic high as an input to a sampling module. The sampling module propagates the signal led at the input as the synchronized signal. The adaptive module causing the input to remain at logic high at least until the synchronization module provides logic level as the synchronized signal. The negative edges in the input signal may also be processed similarly.

13 Claims, 10 Drawing Sheets

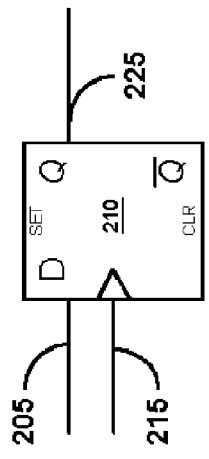
FIG. 2A *(Prior Art)*
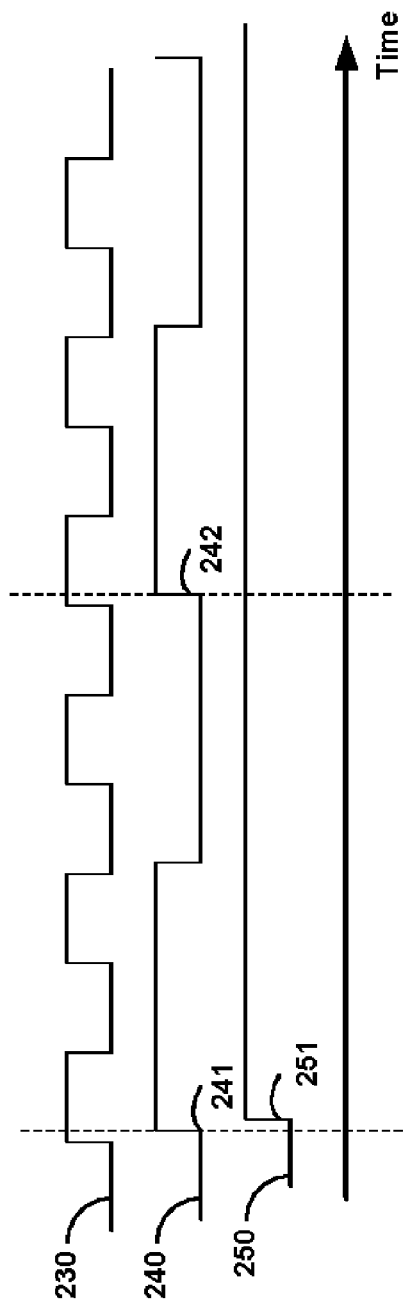
FIG. 2B *(Prior Art)*

SYNCHRONIZATION OF CLOCK SIGNALS IN A MULTI-CLOCK DOMAIN

BACKGROUND OF THE INVENTION

1. Field of the Invention

The present invention relates to the design of electronic circuit, and more specifically to a method and apparatus to synchronize an input clock signal to a sampling clock signal and generate a synchronized clock signal.

2. Related Art

Clock signals are generally used to coordinate and control the operation of various components/devices. In general, the edges of a clock signal provide a time reference at which activities such as transitioning to a next state, sampling a signal on a path, etc, can be performed.

There are several situations in which environments operate in multi-clock domains. A multi-clock domain generally contains multiple clock signals, which are generated independently such that the clock signals potentially do not have a phase and/or frequency relationship. For example, a portion of an integrated circuit (IC) may operate based on one clock signal and another portion of the IC may operate based on another clock signal.

There is often a need to synchronize a clock signal in one domain to a clock signal in another domain. In general, clock synchronization (hereafter simply "synchronization") refers to timing the edges of a clock signal in one domain to the edges of the clock signal in the another domain. In the present application, the clock signal in the one domain is referred to as a input clock signal, the clock signal in the another domain is referred to as a sampling clock signal, and the clock signal generated is referred to as a synchronized clock signal.

Such a synchronization is often used when there is signal/data transfer from one domain to the other. For example, a module operating in one clock domain may need to send data to another module operating in another clock domain, and a common clock reference may be desirable to send data from one module to the other. The common clock reference generally simplifies the reception of the data. A synchronized clock signal provides the desired common clock reference.

At least for reasons such as those noted above, there is a general need to synchronize an input clock signal to a sampling clock signal and generate a synchronized clock signal.

BRIEF DESCRIPTION OF THE DRAWINGS

The present invention will be described with reference to the following accompanying drawings.

FIG. 2A is block diagram illustrating the details of an example synchronizer in a prior embodiment.

FIG. 2B is a timing diagrams depicting the details of signals through paths of FIG. 2A illustrating problems in a prior embodiment.

DETAILED DESCRIPTION OF THE PREFERRED EMBODIMENTS

1. Overview

Figure 1:
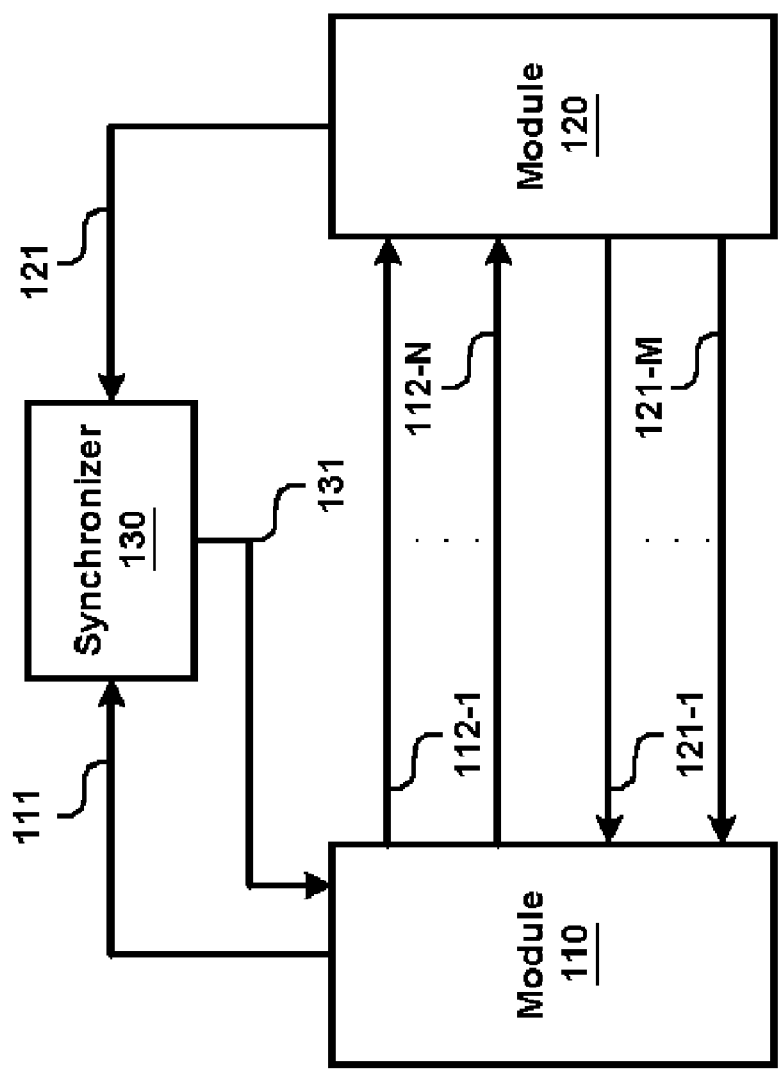
FIG. 1 is a block diagram illustrating the details of an example environment in which a clock synchronizer is implemented.

An aspect of the present invention provides a synchronizer circuit that synchronizes an input clock signal with a sampling clock signal to generate a synchronized signal. In one embodiment, a sampling module samples a logical value received on a first node at time points specified by a positive edge of the sampling clock signal and provides the corresponding sampled values as the synchronized signal. The sampling module may be implemented in the form of a sequence of flip-flips connected in series and being clocked by the sampling clock signal. An adaptive module generates the logical value at the first node as described below.

An adaptive module implemented according to an aspect of the present invention provides logic high at the first node upon an occurrence of a positive edge in the input clock signal after a logic low is provided as the synchronized signal. The adaptive module causes the first node to remain at logic high at least until the synchronization module provides the logic high as the synchronized signal.

The adaptive module provides logic low on the first node upon an occurrence of a negative edge in the input clock signal after the logic high is provided as the synchronized signal. The adaptive module causes the first circuit said logic low at least until the synchronization module provides said logic low as the synchronized signal.

In an embodiment, the adaptive module contains a first circuit inverting a occurrence of a negative edge in the input clock signal after the logic high is provided second node upon an occurrence of the positive edge in the input clock signal after a logic low on the first node is provided as the synchronized signal. A second circuit inverts a logic present on a third node and provides an inverted logical on the third node upon an occurrence of a negative edge in the input clock signal after a logic high on the first node is provided as the synchronized signal. A XOR gate generates the logical value at the first node by performing an XOR logical operation of bits received on the second node and the third node respectively.

Thus, the first node contains a 1 to represent that a positive edge, which need to be propagated as the synchronized signal, is received on the input signal. Similarly, a 0 at the first node indicates that a negative edge, which needs to be propagated as the synchronized signal, is received on the input signal.

Various aspects of the present invention are described below with reference to an example problem. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other method, etc. In other instances, well-known structures or operations are not shown in detail to avoid obscuring the features of the invention.

2. Example Environment

FIG. 1 is a block diagram illustrating the need for a clock synchronizer an example environment. The environment is shown containing modules 110 and 120, and synchronizer 130. The components are described in detail below.

Module 110 and module 120 represent modules operating in different clock domains, respectively referred to as dk1 and dk2 for illustration. Module 110 sends data/signals on paths 112-1 through 112-N at time points specified by synchronized clock signal 131. Module 120 sends data/ signal on paths 121-1 through 121-M at time points specified by dk2. As clock signal 131 is synchronized with respect to dk2, the data transfer can be implemented without potentially requiring additional circuitry between the modules to ensure reliable data sampling.

Synchronizer 130 generates synchronized clock signal 131 according to various aspects of the present invention. Some of the features of the present invention may be appreciated in comparison to example prior circuits. Accordingly, the prior circuits are described below with reference to FIGS. 2A, 2B and 3.

3. Problems with Example Prior Circuits

FIGS. 2A and 2B are diagrams together illustrating synchronization of signals and example problems in a prior embodiment. In particular, FIG. 2A is a circuit diagram illustrating a sampling technique for synchronization of signals, and FIG. 2B is a timing diagram illustrating example problems with the prior approach of FIG. 2A.

With reference to FIG. 2A, D-flip flop 210 is shown receiving an input signal on D-input path 205 and a sampling signal on clock path 215, and generates a synchronized signal on path 225. Such synchronization is attained since flip-flop 210 samples the level of input signal 205 at each positive edge of sampling signal 215. One problem with such a synchronization technique is described in further detail below with reference to FIG. 2B.

FIG. 2B is a timing diagram of various signals of FIG. 2A illustrating a problem with the approach of FIG. 2A. Signals 230, 240 and 250 respectively represent input signal 205, sampling signal 215 and synchronized output signal 225.

Signal 240 is shown changing from logic low to high at time points 241 and 242. D-flip flop 210 transfers the logic level of input signal 230 at time points 241 and 242 corresponding to the positive edge of signal 240 as synchronized signal 250. It may be observed that signal 230 represents logic high at both the time points.

Signal 250 is shown changing from logic low to logic high at time point 251 (following soon after time point 241), and remaining at high even after time point 242.

As may be appreciated, one problem with such synchronization is that signal 250 is shown remaining at logic high (no clock) and not transitioning to lower logic level in spite of several transitions in input clock signal between time points 241 and 242. Accordingly, a reliable synchronized clock signal may not be raved in some cases. Another prior embodiment over comes some of such limitations, as described below with reference to FIG. 3.

Figure 3:
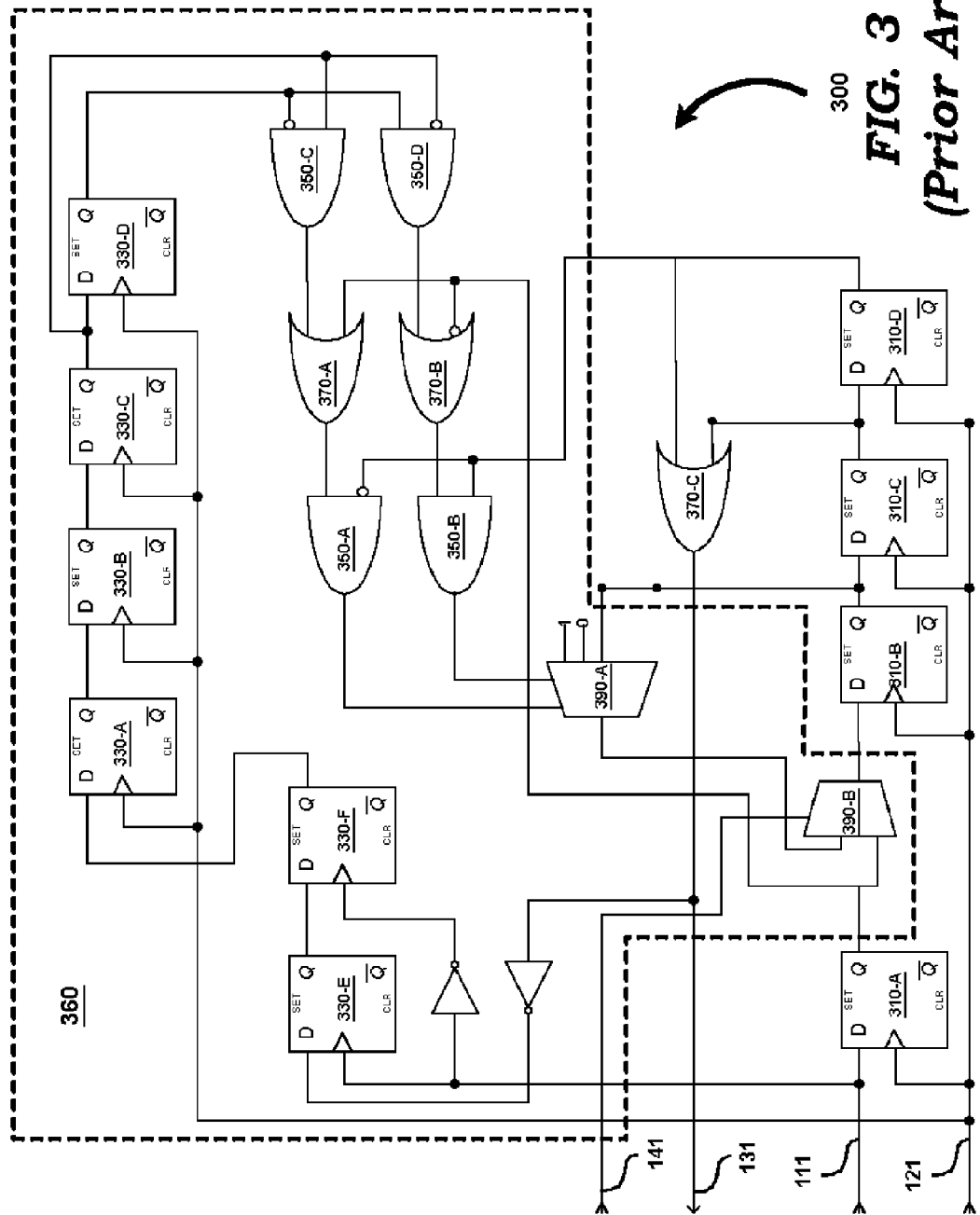
FIG. 3 is a circuit diagram illustrating the details of another prior clock synchronizer.

FIG. 3 is a circuit diagram illustrating problems of another prior circuit designed to overcome some of the problems of prior art described above with reference to FIGS. 2A and 2B. The prior synchronizer 300 of FIG. 3 is shown containing two broad parts. The first part is shown containing D-flip flops 310-A through 310-D, and the second part (adaptive logic) is shown containing D-flip flops 330-A through 330-F (which acts as a control signal synchronizer for the adaptive logic), OR gates 370-A through 370-C, AND gates 350-A and 350-B (which together acts as a clock edge detector and generates control for the forcing of the opposite edge), multiplexers 390-A and 390-B (which control the adaptive outputs).

Broadly, D-flip flops 310-A through 310-D operate to act as a 4-stage synchronization for the input clock (111) with the sampling clock (121). In case a clock edge appears at the input and the sampling clock does not register (i.e., provided as an input to flip-flop 310-B) that edge because of frequency and phase relationship between the clocks, adaptive logic 360 ensures the detection of such a clock edge.

One problem with synchronizer 300 is that the synchronized output on path 131 is generated with a large latency, at least in some situations (e.g., due to the presence of the secondary synchronization flip-flops 330-A through 330-D. Latency in this context refers to time delay between the occurrence of input signal edges and the corresponding output synchronized edges. The latency is due to the delay introduced by adaptive module in processing the input signal and generating the next transition for the output signal 131.

Another problem with synchronizer 300 is that the chances of meta-stability is higher due to the presence of adaptive logic 360 in between synchronization logic (formed by flip-flops 310-A through 310-D).

As is well known, a flip-flop may enter into meta-stability when the data input transitions in a known window (determined by setup and hold time) around the clock transition, thereby leading to an unpredictable/unstable condition in the flip-flop output. As may be noticed, adaptive module 360 receives input signal after one level of synchronization. Further synchronization is done by flip flops 310-B through 310-D.

Yet another problem with synchronizer of FIG. 3 is that some edges of input signal may not be detected and synchronized, since the adaptive synchronizer forces opposite logic to be internally generated. Such internally generated signals will have larger pulse with than input signal due to the large number of components (330-A through 330-F, 350-A through 350-D, 370-A and 370-B, and 390-A and 390-B), at let under some circumstances. This reduces the circuit's effective frequency.

The manner in which various aspects of the present invention overcome some of such problems is described below in further detail starting with reference to FIG. 4.

4. Synchronizer

Figure 4:
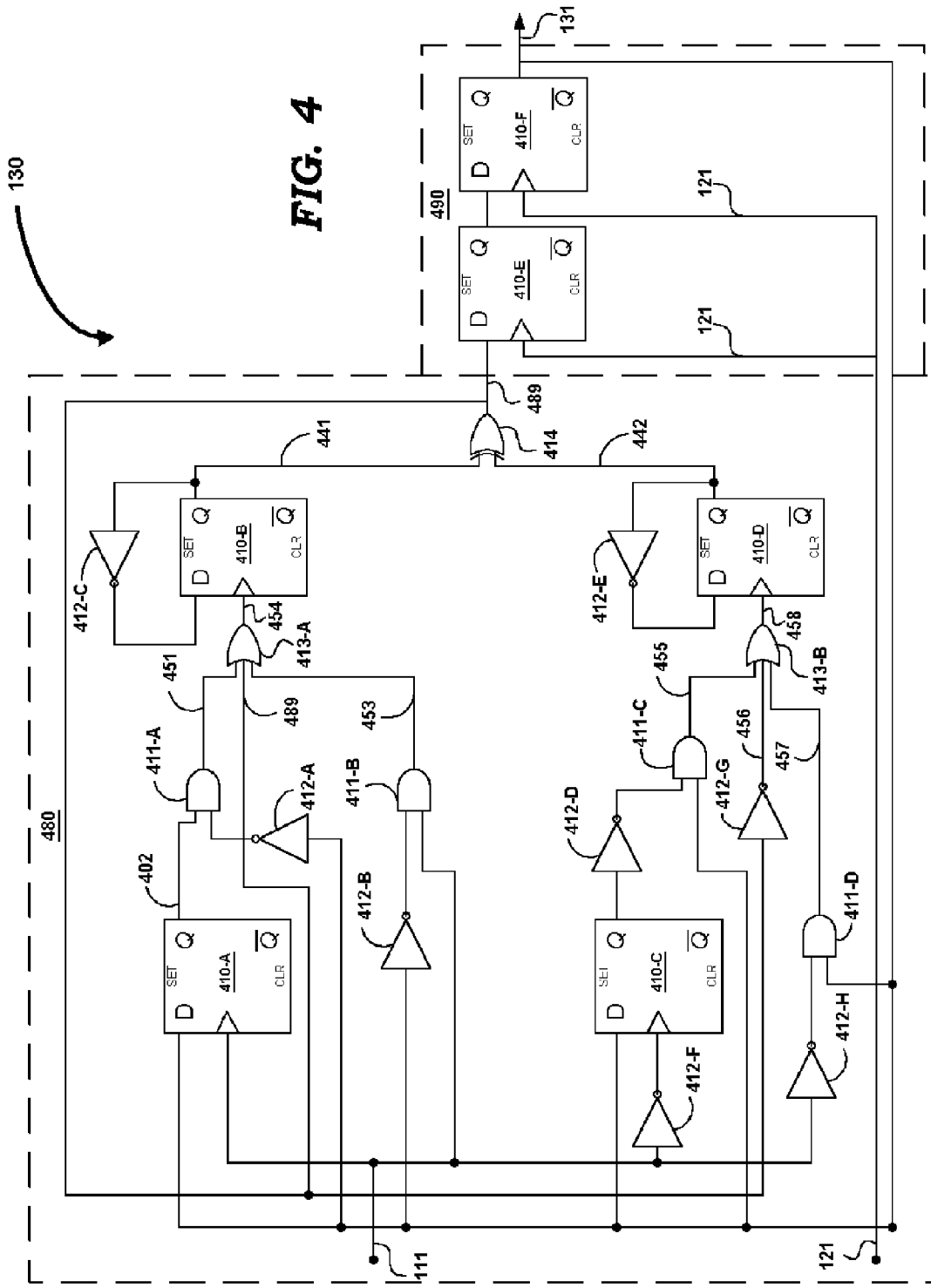
FIG. 4 is a circuit diagram illustrating the details of an example synchronizer circuit implemented according to an aspect of the present invention.

FIG. 4 is a circuit diagram illustrating the details of an example synchronizer circuit implemented according to an aspect of the present invention. Synchronizer circuit 130 is shown containing D-flip flops 410-A through 410-F, AND gates 411-A through 411-D, inverters 412-A through 412-H, OR gates 413-A and 413-B, and XOR gate 414. Each component is described in detail below.

Synchronizer 130 is logically divided into two logic modules—adaptive module 480 and sampling module 490. In brief, sampling module 490 samples the output of adaptive module 480 at time points specified by positive edges of sampling clock 121, and provides the corresponding output as synchronized signal on path 131. Accordingly, sampling module 490 is shown containing D-flip-flops 410-E and 410-F connected in sequence, and each being clocked by sampling clock 121. D-flip flop 410-E receives (as input) the output of adaptive module 480 on path 489, and the output of D-flip flop 410-E is provided as input to D-flip flop 410-F. The output of D-flip-flop 410-F forms the output of synchronizer 130.

Even though synchronization of signals can be implemented using one flip-flop, sampling module 490 is described containing two flip-flops 410-E and 410-F. The two flip-flops are used to avoid meta-stability problem, as is well known in relevant arts.

Adaptive module 480 generates a logic 1 (high output) upon the occurrence of a positive edge in input clock 111 and remains at that level at least until sampling module 490 propagates the high logic level corresponding to the post-transition as synchronized clock 131. Thereafter, adoptive module 480 generates a logic 0(low output) upon the occurrence of a negative edge in input clock 111. The logic 0 is maintained at least until sampling module 490 propagates the low logic level corresponding to the post-transition. A logic 1 is again generated upon the occurrence of a positive edge in input clock 111 after the low logic level is propagated by sampling module 490.

The description is continued with reference to the details of adaptive module 480 in one embodiment. Adaptive module 480 is shown containing D flip flops 410-A through 410-D, AND gates 411-A through 411-D, inverters 412-A through 412-F, OR gates 413-A and 413-B, and XOR gate 414. Broadly, the top portion of the circuit is related to detecting of positive edges in input signal 111 and corresponding indication on path 441, and the bottom portion to perform similar processing in relation to negative edges. The description is provided first with reference to detection of positive edges, and then with reference to negative edge.

With respect to positive edges, D flip flops 410-A and 410-B, AND gates 411-A and 411-B, inverters 412-A, 412-B and 412-C, and OR gate 413-A together operate to provide a transition (either from 0 to 1 or 1 to 0, so as to provide a logic high on path 489) of logic level on path 441 upon the occurrence of a positive edge on input signal 111 after sampling module 490 propagates the low logic level corresponding to the post-transition of a negative edge. Path 441 remains at a logic level corresponding to the post-transition level until positive occurs in input signal 111 after propagation of a negative level to output 131. The manner in which such a result is attained is described below.

AND gate 411-B and inverter 412-B operate to detect a positive edge on input signal 111 after a negative edge is propagated as synchronized signal on path 131. Accordingly, inverter 412-B is shown generating an inverted version of synchronized signal 131, and AND gate performs a logical AND operation of input signal 111 and the output of inverter 412-B. Output of AND gate 411-B is generated on path 453. A logic high is generated on path 453 when input clock transitions to high logic level and synchronized clock is low. This ensures that a positive edge (logic high) on input clock is always detected after the negative edge is propagated to output signal 131. If a positive edge is detected on input signal after synchronization of a positive edge there will not be may change in signals in this embodiment.

Flip-flop 410-A inverter 412-A and AND gate 411-A operates a glitch mask circuit which masks glitches in the output of OR gate 413-A, as described below in further detail with reference to FIG. 7. In other situations, the glitch musk circuit generates a 0 output, thereby not impacting the output of OR gate 413-A. As memory be observed from FIG. 4, flip-flop 410-A receives synchronized signal 131 on D-input, and is clocked by input signal 111. Inverter 412-A inverts synchronized signal 131, and AND gate 411-A performs a logical AND operation of the outputs of inverter 412-A and flip-flop 410-A.

OR gate 413-A operates to generate a positive transition upon occurrence of a positive edge in input signal 111 after the low logical level is propagated to output signal 131. As shown, OR gate 413-A performs a logical OR operation of the outputs of AND gate 411-A, AND gate 411-B and adaptive output 489. For illustration, the operation of OR gate 413-A is analyzed assuming that a low logic level is present on path 489 is already propagated to path 131 and then a transition to high logic level occurs on signal 111.

When a low logic level is present on path 489 and (low logic level is) already propagated to path 131 (and no positive transition has occurred since), it may be noted both the inputs of OR gate 413-A are at 0, causing OR gate 413-A to generate a logic 0. Soon after a positive transition occurs on input signal, the output of AND gate 411-B would change to a 1, causing OR gate 413-A to generate a 1. Thus, OR gate 413-A generates a transition on path 454 when a positive edge is received on input signal 111 after a prior negative edge/level is propagated as output 131.

The output of OR gate 413-A remains at logic high until the next negative edge is detected (which places path 489 to at logic low 0) and indicated as such on path 489. Until such time, the logical value of 1 present on path 489 forces output 454 of OR gate 413-A to a 1 (thereby preventing a positive clock edge input for D-flip flop 410-B).

D-Flip Flop 410-B operates to toggle the value on path 441 from one logic level to other (either 0 to 1 or 1 to 0) upon the occurrence of a positive edge at clock input 454 due to the presence of inverter 412-C in the feedback path from the output terminal to input terminal. As noted above, a positive edge is generated upon the occurrence of a positive edge in the input signal after a prior negative edge of the input signal is propagated to path 131.

It may thus be appreciated that the positive edge to be propagated to path 131 is indicated by change in logic value on path 441. The description is continued with reference to negative edge below.

Similarly, D-flip flops 410-C and 410-D, AND gates 411-C and 411-D, inverters 412-E through 412-H, and OR gate 413-B together operate to provide a transition (either from 0 to 1 or 1 to 0, so as to provide a logic low on path 489) of logic level on path 442 upon the occurrence of a negative edge on input signal 111 after sampling module 490 propagates the high logic level corresponding to the post-transition of a positive edge. Path 442 remains at the post-transition logic level until negative edge occurs in input signal 111 after propagation of a positive level to output 131. The manner in which such a result is attended, is described below.

AND gate 411-D and inverter 412-H operate to detect a negative edge on input signal 111 after a positive edge is propagated as synchronized signal on path 131. To attain such an operation, inverter 412-H is shown generating an inverted version of input signal 111, and AND gate performs a lead AND operation of synchronized signal 131 and the output of inverter 412-H. Output of AND gate 411-D is generated on path 457. A logic high is generated on path 457 when input clock transitions to low logic level and synchronized clock 131 is high. This ensures that a negative edge (10c low) on input clock is always detected after the positive edge is propagated to output signal 131. If a negative edge is received on input signal after synchronization of a negative edge there will not be may change in signals in this embodiment.

Flip-flop 410-C, inverters 412-D/412-F and AND gate 411-C operates a glitch mask circuit which masks glitches in the output of OR gate 413-B, as would be appreciated based on the description below with reference to FIG. 7. In other situations, the glitch mask circuit generates a 0 output, thereby not impacting the output of OR gate 413-B. As may be observed from FIG. 4, flip-flop 410-C receives synchronized signal 131 on D-input, and is clocked by inverse of input signal 111 generated by inverter 412-F. Inverter 412-D inverts output of flip-flop 410-C, and AND gate 411-C performs a logical AND operation of the outputs of inverter 412-D and synchronized signal 131.

OR gate 413-B operates to generate a positive transition upon occurrence of a negative edge in input signal 111 after the high logical level is propagated to output signal 131. As shown, OR gate 413-B performs a logical OR operation of the output of (AND gate 411-C, for glitch removed, as described in later sections,) AND gate 411-D and inverse of adaptive output 489. For illustration, the operation of OR gate 413-B is analyzed assuming that a high logic level is present on path 489 is already propagated to path 131 and then a transition to low logic level occurs on signal 111.

When a high logic level is present on path 489 and already propagated to path 131 (and no negative transition has occurred since), it may be noted both the inputs 456 (due to operation of inverter 412-G) and 457 (due to operation of inverter 412-H) of OR gate 413-B are at 0, causing OR gate 413-B to generate a logical. Soon after a negative transition occurs on input signal, the output of AND gate 411-D would change to a 1, causing OR gate 413-B to generate a 1. Thus, OR gate 413-B generates a transition on path 458 when a negative edge is received on input signal 111 after a prior positive edge level is propagated as output 131.

The output of OR gate 413-B remains at logic high until the next positive edge is detected and indicated as such on path 489. Until such time, the logical value of 1 present on path 489 forces output 458 of OR gate 413-B to a 1 (thereby preventing a positive clock edge input for D-flip flop 410-D).

D-Flip Flop 410-D operates to toggle the value on path 442 from one logic level to other (either 0 to 1 or 1 to 0) upon the occurrence of a positive edge at clock input 458 due to the presence of inverter 412-E in the feedback path from the output terminal to input terminal. As noted above, a positive edge is generated upon the occurrence of a negative edge in the input signal after a prior positive edge of the input signal is propagated to path 131.

Exclusive-OR gate 414 performs an XOR (included to mean XNOR) lead operation of the two inputs received on paths 441 and 442. The resulting output on path 489 is noted above with respect to the operation of adoptive module 480, and described in further detail below with respect to FIGS. 4 and 5. Briefly, when a positive edge is detected on input clock 111, the inputs on paths 441 and 442 are different logic values and thus the logic level on path 489 equals '1' representing logic level corresponding to positive edge. When a negative edge is detected on input clock 111, the inputs on paths 441 and 442 are equal and thus the logic level on path 489 equals '0' representing logic level corresponding to negative edge.

As described below with reference to timing diagrams, the bit values on paths 441 and 442 cycle through values 00, 01 assuming negative edge detection), 11 (now positive edge detection), and 10 (and back to 00), or 00, 10 (assuming positive edge detection), 11 (now negative edge detection), and 10 (and bask to 00) corresponding to each change in the level of the signal on output 131.

The output thus generated on path 489 is sampled and propagated to path 131 by sampling module 490 as described above. As may be appreciated, adaptive module 480 reliably detects the edges as desired, and the logical values of 1 and 0 respectively representing rising and falling edges are generated as output. Sampling module 490 samples the output thus generated to provide synchronized signal 131. Due to the fewer flip-flops and other components in generating output 489 from input signal 111 and various processing operations happening by circuits operating in parallel, the synchronized clock signal may be generated with a low latency. The description is continued with reference to some timing diagrams illustrating the operation of the circuit of FIG. 4 in further detail.

5. Timing Diagram

Figure 5A:
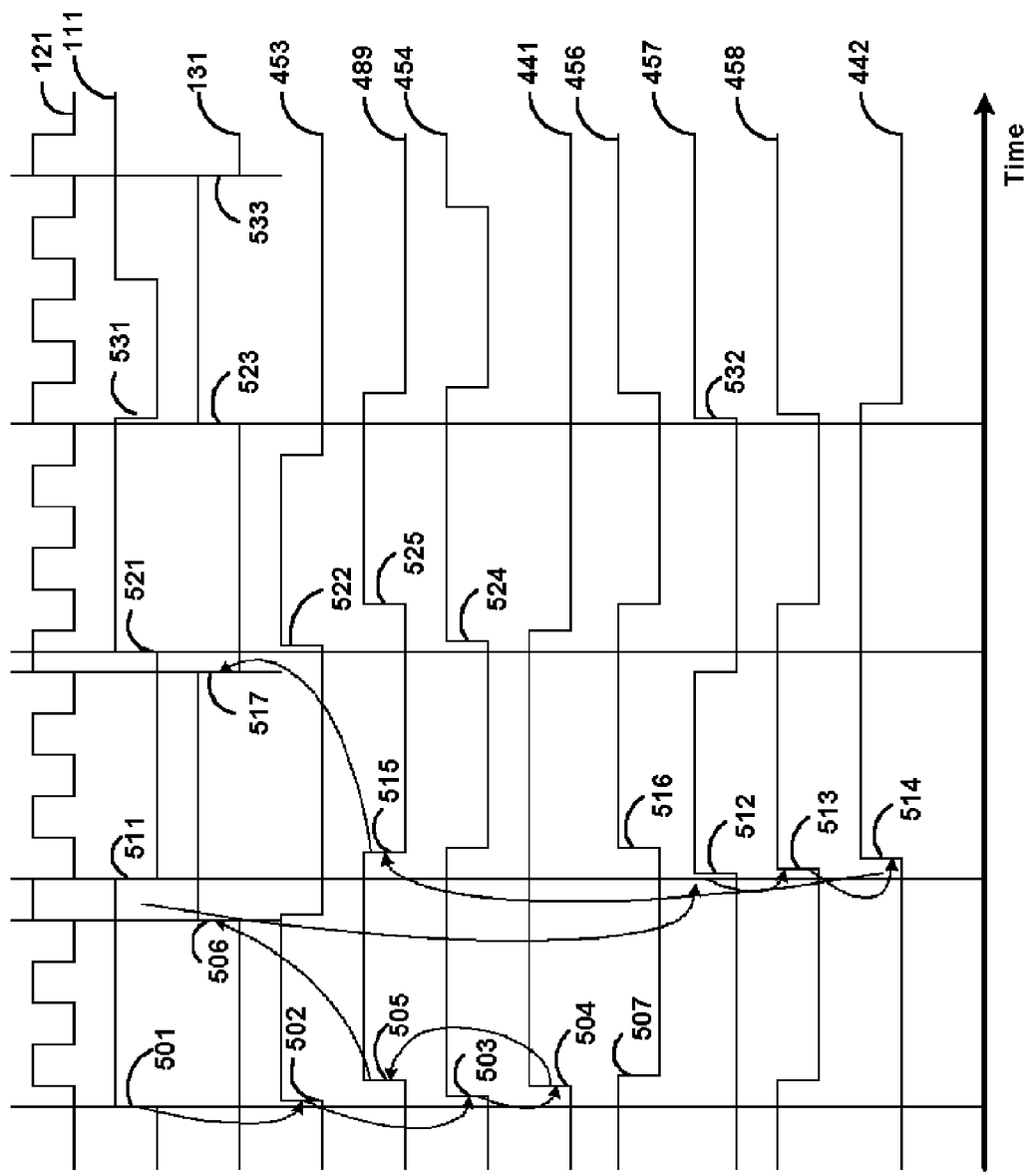
FIG. 5A is a timing diagram depicting the details of various signals when the sampling signal has a higher frequency than input signal in one embodiment.

FIG. 5A is a timing diagram depicting the details of various signals through different paths of FIG. 4 when sampling signal 121 has a higher frequency than input signal 111 in one embodiment. The timing diagram is shown containing input signal 111, sampling signal 121, synchronized signal 131, signals on paths 453, 489, 454 and 441 (operated in relation to positive edge), and signals on paths 456, 457, 458 and 442 (operated in relation to negative edge). The description is provided first with reference to a positive edge in input signal 111, and then with reference to negative edge.

Input signal 111 is shown containing a positive transition at time point 501. For illustration it is assumed that synchronized signal is at logic low (i.e., prior negative transition is propagated), prior to time point 501. A prior negative transition is assumed to have forced signal 454 to 0, as also shown prior to time point 501. For illustration, it is assumed that both signals 441 and 442 are at 0.

Soon after the positive transition at time point 501 in input signal 111, a transition to logic high (representing detection of the positive transition) is shown on signal 453 at time point 502 due to the operation of inverter 412-B and AND gate 411-B.

A positive transition on path 453 causes signals on path 454 to correspondingly change to logic high, forming a positive edge at time point 503 on path 454. The positive edge triggers a change of state of flip-flop 410-B, and due to the operation of inverter 412-C in the feedback path, signal 441 is shown changing from 0 to 1 at time point 504.

A change of due on path 441 causes XOR 414 to generate a value of 1 on path 489, as shown at time point 505. The post-transition value of 1 is shown propagated to synchronized signal 131 in two positive edges of sampling clock 121 as shown at time point 506 on synchronized signal 131.

The description is continued with respect to the manner in which negative edges on input signal 111 are propagated to synchronized signal 131. The negative edge, which is thus propagated, is shown at time point 511.

It is first helpful to note a positive transition occurring before time point 501 (having occurred when synchronized signal 131 is already at logic low) causes path 458 to transition to logic low, and accordingly signal 458 is shown at logic low prior to time point 501.

The negative transition on input signal 111 at time point 511 causes signal 457 to transition to logic high a shown at time point 512. The logic high is propagated to path 458, accusing a positive edge to be generated as clock input of D-flip-flop 410-D at time point 513. The positive clock edge causes the output of D-flop-flop to be toggled to high logic value, as shown at time point 514.

A logic 1 on both of paths 441 and 442 causes path 489 to go to a low logic level (0) at time point 515. The 0 value is shown propagated as synchronized signal 131 at time point 517 (at the second positive edge of sampling signal 121 following time point 515).

It may be observed that signal 454 is forced to a logic (indicating that the next positive transition on input signal 111 would cause a clock signal to be generated on clock input 454) soon after path 489 transitions to logic low at time point 515. Also, path 456 (inverse of 489) maintains signal 458 at logic high until the next positive edge gets propagated to 489.

The next positive edge in input signal 111 at time point 521 is shown causing a positive clock transition (on path 454) at time point 522, which in turn causes path 441 to transition from 1 to 0. The transition causes XOR to generate 1 on path 489 at time point 525 since path 442 is at 1. The 1 output is shown propagated as synchronized signal 131 at time point 523.

The next negative edge in input signal 111 at time point 531 is shown causing a positive clock transition (on path 458) at time point 532, which in turn causes path 442 to transition from 1 to 0. The transition causes XOR to generate 0 on path 489 since path 441 is at 0. The 0 output is shown propagated as synchronized signal 131 at time point 533. Thus, by toggling the value on path 441 upon appropriate positive edge in input signal 111, and the value on path 442 upon appropriate negative edge in input signal 111, path 489 may be caused to generate a 0 when a logic low is to be propagate to synchronized signal 131 and a 1 when a logic high is to be propagated to synchronized signal 131.

From the above, it may be appreciated that the circuit of FIG. 4 generates synchronized signal 131 when sampling signal 121 has a higher frequency than input signal 111. However, the circuit of FIG. 4 can be used in situations when sampling signal 121 has a lower frequency than input signal 111, as described below with reference to FIG. 5B.

Figure 5B:
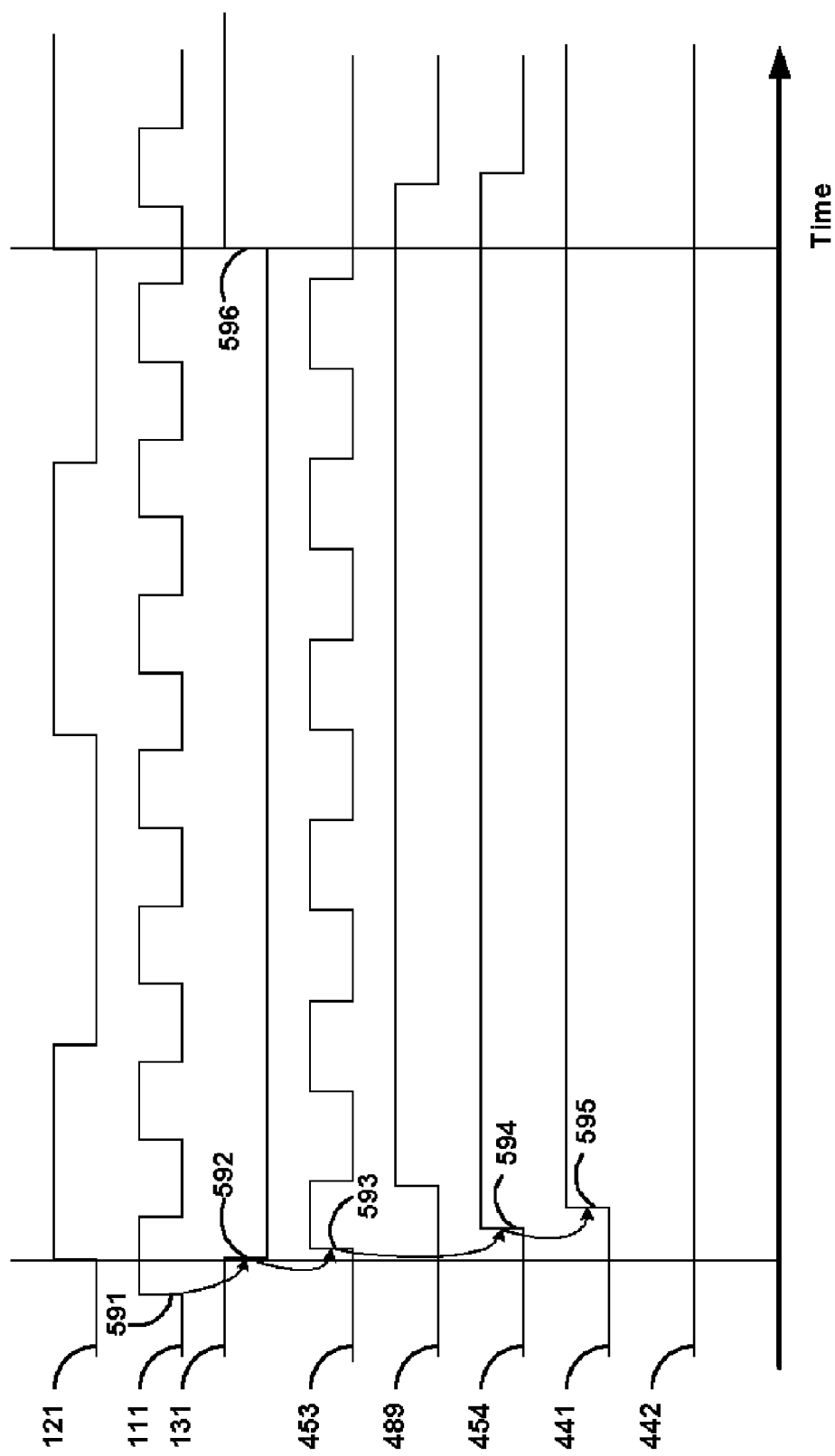
FIG. 5B is a timing diagram depicting the details of various signals when the sampling signal has a lower frequency than input signal in one embodiment.

FIG. 5B is a timing diagram depicting the details of various signals through different paths of FIG. 4 when sampling signal 121 has a lower frequency than input signal 111 in one embodiment. The timing diagram is shown containing input signal 111, sampling signal 121, synchronized signal 131, and signals on paths 453, 489, 454, 441, 442 operated in relation to a positive edge detection. Merely for conciseness, the signals related to negative edge detection are not shown/described. The description is provided with reference to a positive edge in input signal 111.

Input signal 111 is shown containing a positive transition at time point 591. It is assumed that a prior negative transition has forced signal 454 to 0, as shown prior to time point 591. For illustration, it is assumed that both signals 441 and 442 are at 0 prior to time point 591.

The synchronized signal 131 is shown being in logic high at time point 591, and transitioning to logic low at time point 592. Since input signal 111 is at logic high from time point 592, path 453 transitions to logic high soon thereafter upon a rising edge (positive transition) of sampling signal 121 at time point 593. A positive clock transition (on path 454) occurs at time point 593 (due to the transition on path 453), which in turn causes path 441 to transition from 0 to 1 shown at time point 594. The transition causes XOR to generate 1 on path 489 since path 442 is at 0 shown at time 595. The 1 output is shown propagated as synchronized signal 131 shown at time point 596 (upon the second rising edge of sampling signal 121 following time point 595).

The synchronized signal 131 is shown transitioning to logic high at time point 596 to correspond to logic high level at time point 592 in input clock signal 111. Several positive edges (logic levels) occurred in input signal 111 between time points 592 and 596 are ignored since path 454 continues to be at logic high (until a next negative edge is detected on path 442 and propagated to path 131). Negative edges in input signal 111 also are ignored in the sane duration since the positive edge is not yet propagated to synchronized signal 131.

From the above, it may be appreciated that the circuit of FIG. 4 generates synchronized signal 131 in cases when sampling signal 121 has a lower or higher frequency than input signal 111. It may be further noted that synchronizer 130 requires a negative edge to be detected after the positive edge in the input clock signal and vice versa, and a clock will always result in the synchronized clock signal. The edges (high or low) of input clock signal are detected by the adaptive logic part of the circuit. This detected level (in the form of 0/1 for the case of negative/positive transitions respectively) is held at the input of sampling part of the circuit, thereby accusing synchronized signal 131 to be generated.

The description is continued with reference to the manner in which glitches are avoided as inputs to flip-flops according to various aspects of the present invention. As is well known, glitches generally refer to pulses of very short duration, which could lead to unpredictable results when provided as inputs to sequential elements. Various components of FIG. 4A operate to avoid of glitches at the input of flip-flop 410-B as described below with reference to FIGS. 6 and 7.

6. Glitch Avoidance Due to Feedback from Adaptive Module Output

Figure 6:
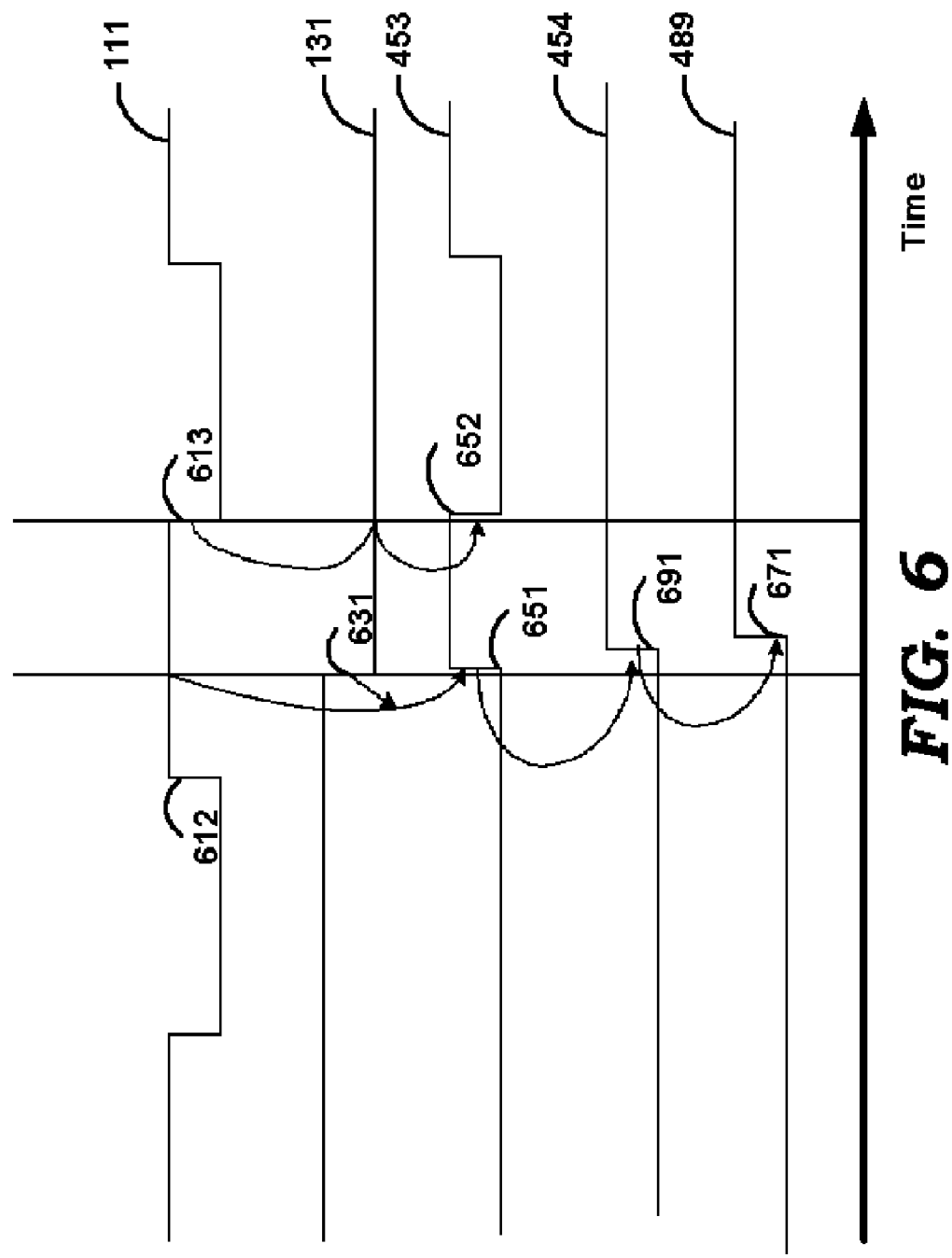
FIG. 6 is a timing diagram illustrating the manner in which the feedback provided from an adaptive module avoids glitch from propagating to output signal in one embodiment.

FIG. 6 is a timing diagram illustrating development of glitches on path 453, and the manner in which adoptive clock feedback provided on path 489. The timing diagram is shown containing input signal 111, synchronized signal 131, output signal of AND gate 411-B on path 453, adaptive signal on path 489 and input clock signal of flip flop 410-B on path 454.

Input Signal 111 is shown transitioning at time point 612 to logic high and then to logic low at time point 613. Synchronized signal 131 is shown transitioning to logic low at time point 631, which is between time points 612 and 613.

Signal 453 is shown going to logic high at time point 651 (soon after time point 631) and then to logic low at time point 652 (soon after time point 613). A short duration between time points 651 and 652 would form a glitch on path 453. If signal 453 done were provided as input of OR gate 413-A, a glitch (defined between time points 651 and 652) would result on path 454. Input 489 to OR gate 413-A avoids such a glitch as described below.

The transition on path 453 at time point 651 is shown propagated to path 454 at time point 691, which causes a positive transition on path 489 at time point 471.

Path 489 continues at logic high until the next negative edge is detected. Accordingly, path 489 is shown continuing at logic high before and beyond time point 652. Since 489 is provided as an input to OR gate 413-A, path 454 continues to be high for a longer duration past the glitch between time points 651 and 652. Accordingly, glitch is avoided as an input to flip-flop 410-B in the scenario of FIG. 6.

It may be noted that input clock signal 111 changed after adaptive signal feedback appeared on path 489, thereby glitch was avoided by signal 489. However, in cases where input signal 111 changes before adaptive signal changes, the combination of flip-flop 410-A, AND gate 411-A and inverter 412-A ("glitch mask circuit") complement the above-described operation to avoid glitches on path 454.

7. Glitch Avoidance Due to Glitch Mask Circuit

Figure 7:
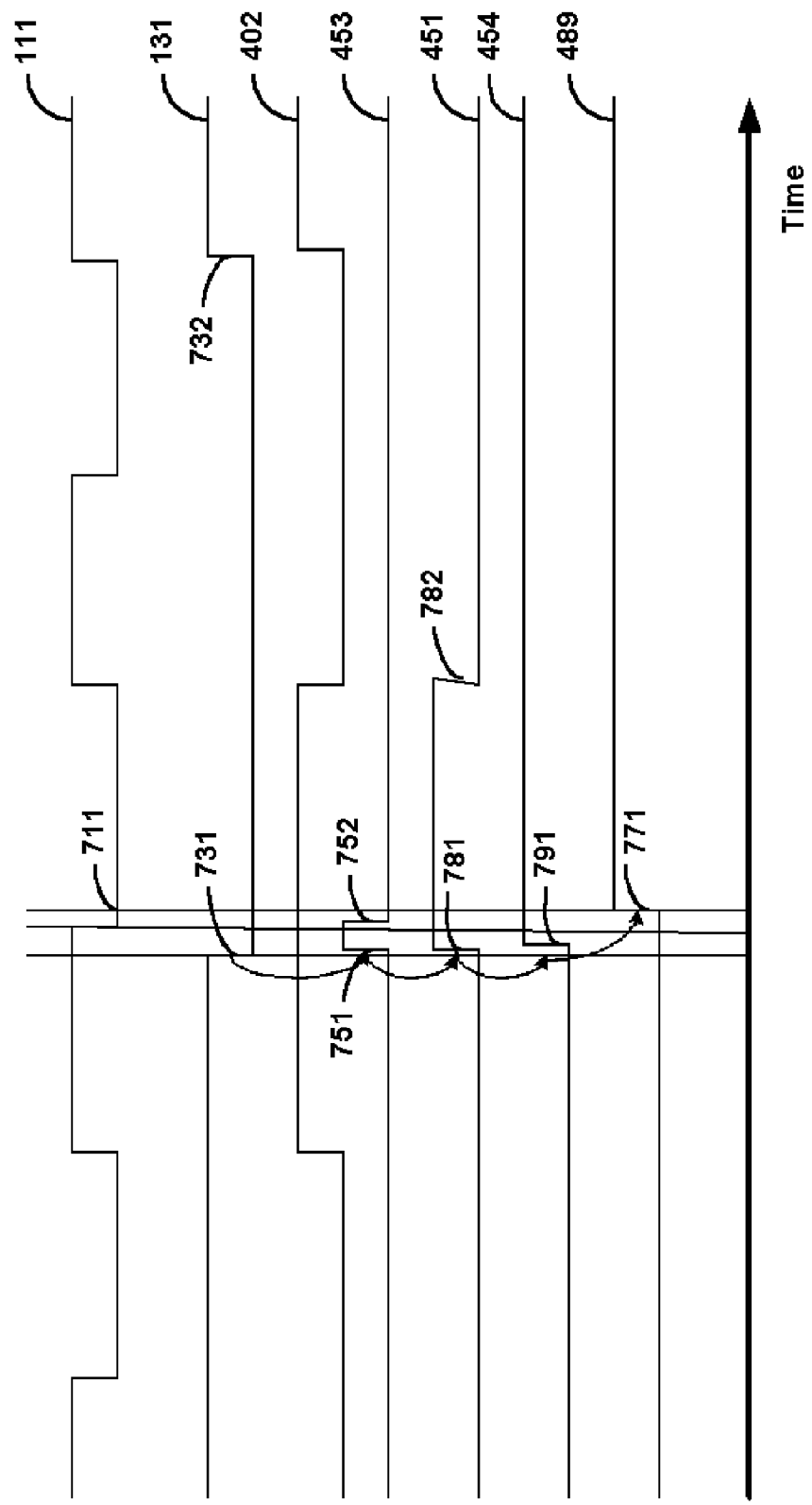
FIG. 7 is a timing diagram illustrating the manner in which a glitch mask circuit avoids glitches from propagating to output signal in one embodiment.

FIG. 7 is a timing diagram illustrating the development of glitches on path 453 in one scenario, and the manner in which the glitch mask circuit masks the glitches from the input of OR gate 413-A. The timing diagram is shown containing input signal 111, sampling signal 121, synchronized signal 131, output signal of AND gate 411-B on path 453, output signal of glitch mask circuit on path 451, adoptive signal on path 489 and input clock signal of flip flop 410-B on path 454.

Input Signal 111 is shown transitioning at time point 711 to logic low and at 712 to logic high, and synchronized signal 131 is shown transitioning to logic low at time point 731, which is before time point 711.

Signal 453 is shown going to logic high at time point 751 (soon after time point 731) and then to logic low at time point 752 (soon after time point 711). A short duration between time points 751 and 752 would form a glitch on path 453. If signal 453 done were provided as input of OR gate 413-A, a glitch (defined between time points 751 and 752) would result on path 454. Glitch formed on path 453 is before (on time scale) adaptive signal on path 489 becomes high at 771. Thus adoptive feedback does not operate to avoid glitch on path 454. In such a scenario, input 451 to OR gate 413-A avoids such a glitch as described below.

Signal 451 is shown transitioning to logic high at time point 781 and to logic low at time point 782, which is output signal of AND gate 411-A AND gate 411-A receives input signal on path 402 and inverse of synchronized signal. At time point 781, signal 402 and inverse of synchronized signal is high causing signal 451 to transition to logic high. At time point 782, signal 402 transition to logic low as a logic '0' no synchronized signal will be propagated to path 402 by flip flop 410-A at positive transition of signal 111 at time point 712.

Signal 451 being one of input signals of OR gate 413-A, causes 413-A to stay high even when signal 453 transitions to low at time point 752. Accordingly, the glitch on path 453 is not propagated to path 454.

Path 489 transitions to logic high at time point 771 and continues at logic high until the next negative edge is detected. Since 489 is provided as an input to OR gate 413-A, path 454 continues to be high for a longer duration until the next negative edge is detected. Accordingly, glitch is avoided an input to flip-flop 410-B in the scenario of FIG. 7.

The description is continued with reference to the manner in which meta-stability is avoided in flip-flops coding to various aspects of the present invention. Various components of FIG. 4A operate to avoid meta-stable condition in flip-flops 410-B/410-D as described below with reference to FIG. 8.

8. Meta-Stability Avoidance Due to Feedback from Adaptive Module Output

Figure 8:
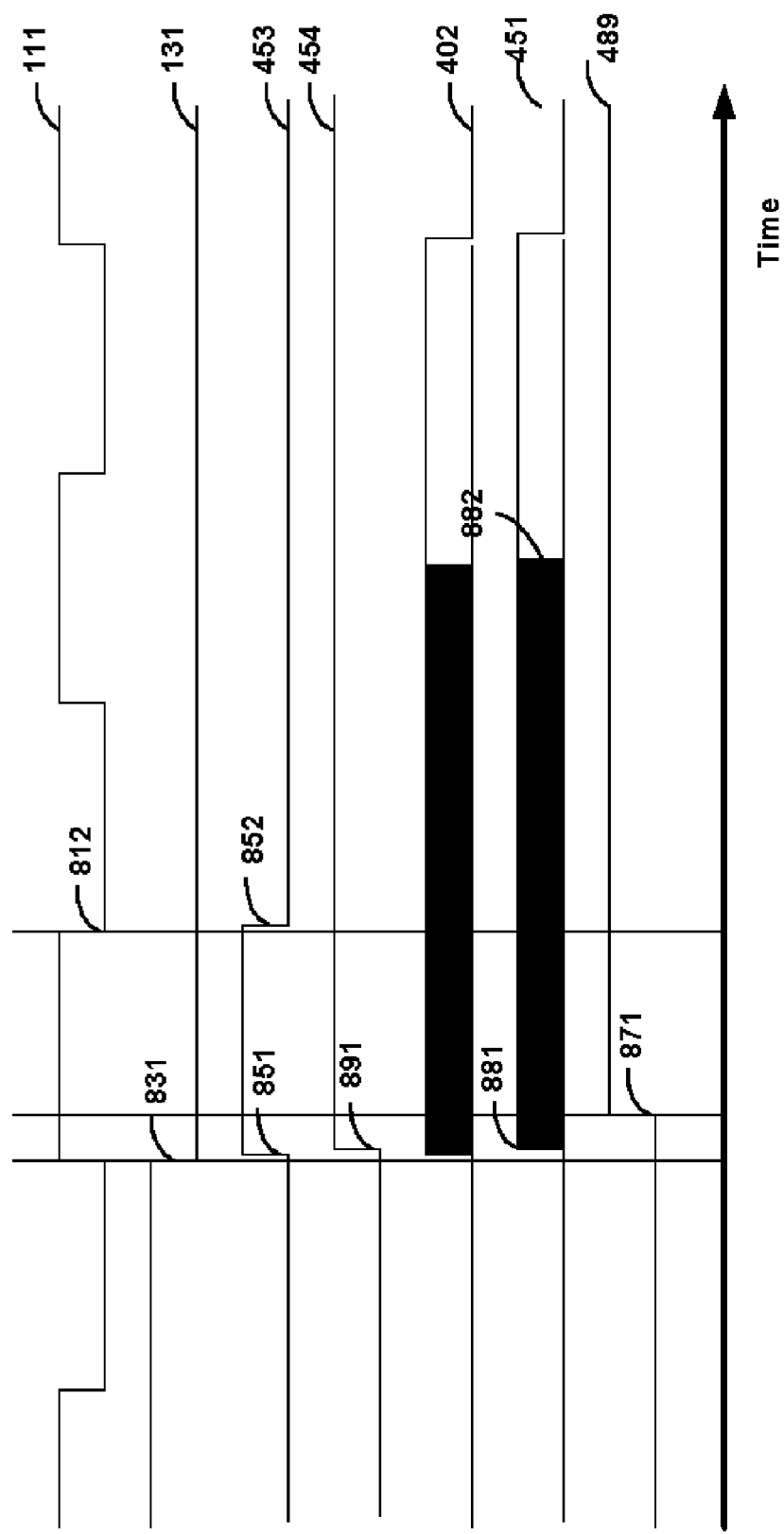
FIG. 8 is a timing diagram illustrating development of meta-stability and the manner in which adaptive clock feedback avoids meta-stability from propagating to output signal.
Figure 9:
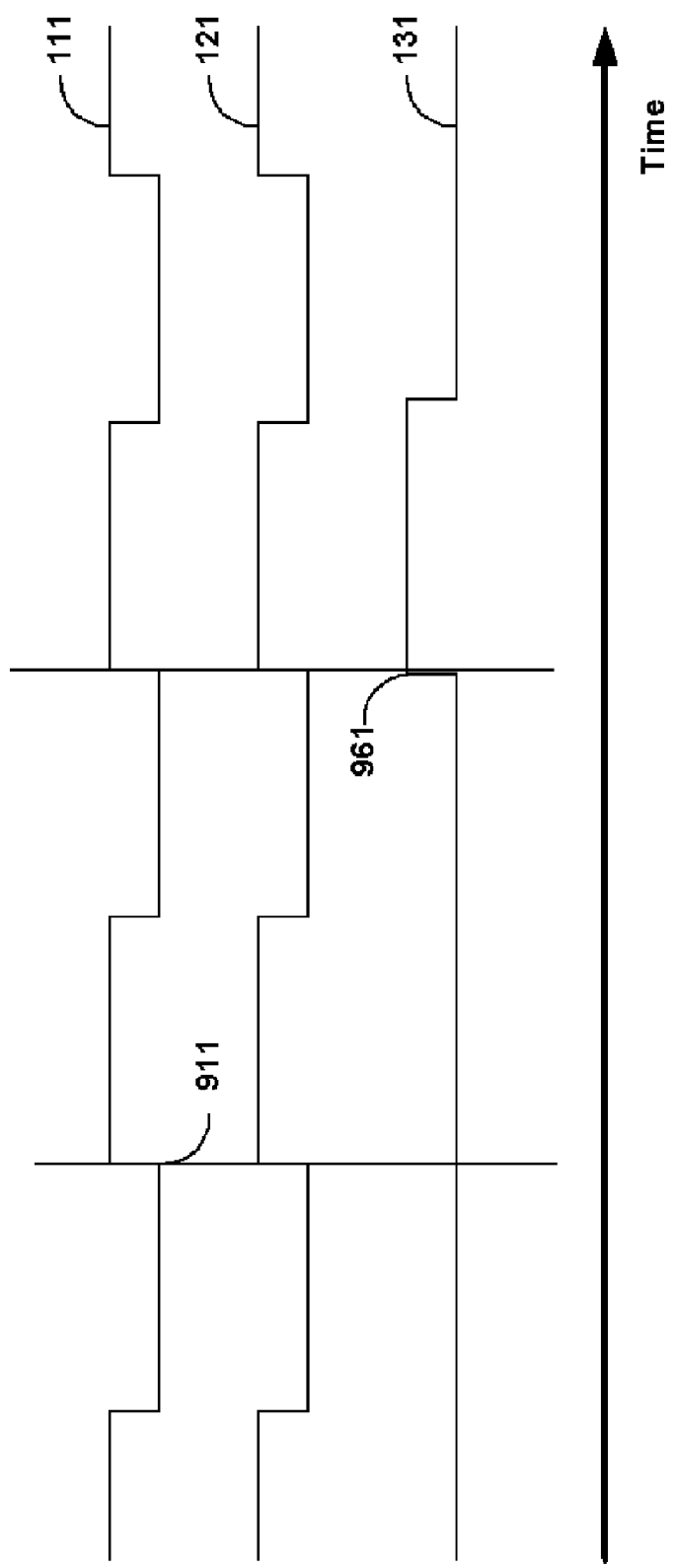
FIG. 9 is a timing diagram depicting the details of various signals.

FIG. 8 is a timing diagram illustrating development of meta-stability on path 451, and the manner in which adaptive clock feedback provided on path 489 avoids meta-stability from propagating to path 454. The timing diagram is shown containing input signal 111, synchronized signal 131, output signal of AND gate 411-B on path 453, adaptive signal on path 489, output signal of AND gate 411-A on path 451, output signal of flip flop 410-A on path 402 and input clock signal of flip flop 410-B on path 454.

Path 402 is shown at a signal level corresponding to a meta-stability condition, as depicted by dark shade between time points 861 and 862. The meta-stable condition is generated in output signal of flip flop 410-A because both synchronized signal 131 and input signal 111 are shown transitioning at sane time point 831.

Signal 451 is shown at a meta-stable condition between time points 881 and 882 (as depicted by a dark shade) due to the propagation of the signal from path 402 (since path 131 is at logic low). The unstable signal is not propagated to the output (454) of OR gate 413-A due to the operation of the other two inputs 489 and 453, as described below.

Signal 453 is shown containing positive transition at time point 851, which is ahead of time point 881 since the combination of inverter 412-B and AND gate 411-B operates on the same inputs (131 and 111) as flip-flop 410-A. The positive transition ensures that path 454 is at logic high irrespective of the meta-stable signal on path 451.

Signal 489 transitions to high at time point 871 corresponding to transition of signal 454 at time point 891, and the logic high continues until next negative edge is propagated on path 489. Thus, path 489 continues to be at logic high even after signal 453 transitions to logic low at time point 852. As a result, signal 454 is not affected by meta-stable condition on path 451.

It may be noted that in any case where synchronized clock changes at the same time as input clock, a meta-stable condition is generated on one of the input signal of OR gate 413-A. But this condition is avoided by adaptive clock signal input of OR gate 413-A. Same analysis could be extended in case of flip flop 413-C and it could be shown that adaptive signal on path 456 avoids the meta-sable condition on input clock signal 458.

Thus problems from meta-stability may be avoided due to the operation of various components of FIG. 4. The circuit of FIG. 4 operates with a low latency also as described below.

9. Latency Analysis

In general, latency refers to time delay with which an edge (positive or negative) detected on input signal is sampled to generate the corresponding (post-transition) logic level on the synchronized output signal. By keeping the latency low, a circuit can achieve maximum throughput and a low latency may be attained as described below with reference to FIGS. 4 and 5A.

It is first helpful to appreciate that there are two components to the latency—the first for adaptive module 480 to detect an edge and set path 489 to a corresponding value, and the second for sampling module 490 to propagate the value on path 489 to synchronized signal 131. The second component is shown to exist even in the prior circuit of FIG. 3. Accordingly, the comparison is continued with respect to the first component done, as described below.

With respect to the latency caused by adaptive module 480, it may be appreciated that the delay is primarily for a edge to be detected by the operation of inverter 412-B and AND gate 411-B to generate a positive transition on path 454 and thereby trigger flip flop 410-B to generate signal on 441 as input to XOR gate 413-A to produce adaptive module output on 489.

The latency is described in further detail below with respect to positive edge detection. The latency associated with negative edge detection is described similarly.

Other than for logic low to be received on synchronized signal 131, the delay associated with detection of an edge and generation of output signal on 489 is substantially signal propagation day since elements inverter 412-B, AND gate 411-B, inverter 412-C, and XOR gate 414 are combinatorial and the transition by flip-flop 410-B is triggered on the output of OR gate 454. The negative signal would be received as soon as sampling module 490 propagates a previously received negative edge as synchronized signal 131, which delay exists (overlaps with) with the operation of sampling module 490 anyway.

Thus, the minimum latency or best-case scenario would occur if the synchronized signal 131 goes low when input signal 121 is high and immediately the positive edge can be processed. Minimum latency (best-case) in above noted case will be: dk-to-Q of flip flop 410-B+XOR gate delay. The worst case scenario would occur if the synchronized signal 131 goes low when input signal 121 is low for a positive edge. A positive edge to be processed will appear only after half of input clock period goes from low to high. Maximum latency (worst-case): 2(Input clock period)+dk-to-Q of flip flop 410-B or 410-D+XOR gate delay. Thus, synchronizer 130 operates with a low latency.

10. Conclusion

While various embodiments of the present invention have been described above, it should be understood that they have been presented by way of example only, and not limitation. Thus, the breath and scope of the present invention should not be limited by any of the above described exemplary embodiments, but should be defined only in accordance with the following claims and their equivalents.

What is claimed is:

1. A synchronizer circuit synchronizing an input clock signal with a sampling clock signal to generate a synchronized signal, said synchronizer comprises:
    a sampling module sampling a logical value received on a first node at time points specified by one of a first edge type and a second edge type of said sampling clock signal and providing corresponding sampled values as said synchronized signal; and
    an adaptive module generating said logical value at said first node, said adaptive module comprising:
    a first circuit inverting a logic value present on a second node and providing an inverted logic value on said second node upon an occurrence of a first edge type in said input clock signal after a first logical level on said first node is provided as said synchronized signal;
    a second circuit inverting a logic value present on a third node and providing an inverted logic value on said third node upon an occurrence of a second edge type in said input clock signal after a second logical level on said first node is provided as said synchronized signal; and
    a XOR gate generating said logical value at said first node by performing an XOR operation of bits received on said second node and said third node respectively.

2. The synchronization circuit of claim 1, wherein said first edge type comprises a positive edge and said second edge type comprises a negative edge.

3. The synchronization circuit of claim 2, wherein said first logical level represents a 0 and said second logical level represents a 1.

4. The synchronization circuit of claim 2, wherein said sampling module comprises a sequence of flip-flips connected in series and being clocked by said sampling clock signal.

5. The synchronization circuit of claim 4, wherein said first circuit comprises:
    a first flip-flop raving a first signal on a clock input, said first signal containing a positive transition upon an occurrence of a positive edge in said input clock signal after a logic low on said first node is provided as said synchronized signal and a negative transition upon an occurrence of a negative edge in said input clock signal after a logic high on said first node is provided as said synchronized signal; and
    a first inverter connected between an input terminal and an output terminal of said first flip-flop, said first inverter inverting said logic value present on said second node to generate a first inverted logic,
    wherein said first flip-flop provides said first inverted logic value on said second node when said first signal is received with said positive transition and said second node remains at said first inverted logic until next positive transition is received on said first signal.

6. The synchronization circuit of claim 5, wherein said first circuit further comprises:
    a second inverter inverting said synchronized signal and generating an inverted synchronized signal;
    a first AND gate receiving said inverted synchronized signal on a first AND input and said input clock signal on a second AND input, and generating a first AND output representing a logic high upon an occurrence of a positive edge in said input clock signal soon after said synchronized signal transitions to logic low, and said first AND output follows said input clock signal at least until said synchronized signal represents logic low; and
    a first OR gate receiving said first AND output on one OR input and a logical value on said first node on another OR input, and generates said first signal.

7. The synchronization circuit of claim 6, wherein said first circuit further comprises:
    a second flip-flop being clocked by said input signal and receiving said synchronized signal on a D-input;
    a third inverter inverting said synchronized signal and generating a third inverted signal; and
    a second AND gate performing a logical AND operation of an output of said second flip-flop and said third inverted signal, an output of said second AND gate being provided as an input to said first OR gate.

8. The synchronization circuit of claim 5, wherein said second circuit comprises:
    a first flip-flop receiving a first signal on a clock input, said first signal containing a positive transition upon an occurrence of a negative edge in said input clock signal after a logic high on said first node is provided as said synchronized signal and a negative transition upon an occurrence of a positive edge in said input clock signal after a logic low on said first node is provided as said synchronized signal; and a first inverter connected between an input terminal and an output terminal of said first flip-flop, said first inverter inverting said logic value present on said third node to generate a first inverted logic, wherein said first flip-flop provides said first inverted logic value on said third node when said first signal is received with said positive transition and said second node remains at said first inverted logic until next negative transition is received on said first signal.

9. The synchronization circuit of claim 8, wherein said second circuit further comprises:

a second inverter inverting said input signal and generating an inverted input signal;

a first AND gate raving said inverted input signal on a first AND input and said synchronized signal on a second AND input, and generating a first AND output representing a logic high upon an occurrence of a negative edge in said input clock signal soon after said synchronized signal transitions to logic high, and said first AND output follows said input clock signal at least until said synchronized signal represents logic high; and a first OR gate receiving said first AND output on one OR input and an inversion of a logical value on said first node on another OR input, and generates said first signal.

10. The synchronization circuit of claim 9, wherein said second circuit further comprises:

a second flip-flop being clocked by an inversion of said input signal and receiving said synchronized signal on a D-input;

a third inverter inverting on output of said second flip-flop and generating a third inverted signal; and a second AND gate performing a logical AND operation of said synchronized signal and said third inverted signal, an output of said second AND gate being provided as another input to said first OR gate.

11. A synchronizer circuit synchronizing an input clock signal with a sampling clock signal to generate a synchronized signal, said synchronizer comprises:

a first flip-flop being clocked by said input clock signal and receiving said synchronized signal on a D-input;

a first inverter inverting said synchronized signal and generating a first inverted signal;

a first AND gate performing a logical AND operation of output of said first flip-flop and said first inverted signal;

a second inverter inverting said synchronized signal and generating a second inverted signal;

a second AND gate performing a logical AND operation of said second inverted signal and said input clock signal;

a first OR gate performing a logical OR operation of output of said first AND gate, output of said second AND gate, and a logical value on a first node;

a second flip-flop receiving a output of said first OR gate on a clock input;

a third inverter connected between an input terminal and an output terminal of said second flip-flop;

a fourth inverter inverting said input clock signal and generating a fourth inverted signal;

a third flip-flop being clocked by said fourth inverted signal and receiving said synchronized signal on a D-input;

a fifth inverter inverting output of said third flip-flop and generating a fifth inverted signal;

a third AND gate performing a logical AND operation of said fifth inverted signal and said synchronized signal;

a sixth inverter inverting said input clock signal and generating a sixth inverted signal;

a fourth AND gate performing a logical AND operation of said sixth inverted signal and said synchronized signal;

a seventh inverter inverting said synchronized signal and generating a seventh inverted signal;

a second OR gate performing a logical OR operation of output of said third AND gate, output of said fourth AND gate, and said seventh inverted signal;

a fourth flip-flop receiving a output of said second OR gate on a clock input;

a eighth inverter connected between an input terminal and an output terminal of said fourth flip-flop; and an XOR gate performing an XOR operation of the output of said second flip-flop and the output of said fourth flip-flop, the output of said XOR gate being provided on said first node.

12. A synchronizer circuit synchronizing an input clock signal with a sampling clock signal to generate a synchronized signal, said synchronizer comprises:

means for inverting a logic value present on a second node and providing an inverted logic value on said second node upon an occurrence of a first edge type in said input clock signal after a first logical level on said first node is provided on said synchronized signal;

means for inverting a logical value present on a third node and providing an inverted logical value on said third node upon an occurrence of a second edge type in said input clock signal after a second logical level on said first node is provided as said synchronized signal; and means for performing an XOR operation of bits received on said second node and said third node respectively to generate a logical value at a first node; and means for sampling said logical value received on said first node at time points specified by one of a first edge type and a second edge type of said sampling clock signal and providing corresponding sampled values as said synchronized signal.

13. A method of synchronizing input clock signal with a sampling clock signal to generate a synchronized signal, said method comprising:

inverting a logic value present on a second node and providing an inverted logical value on said second node upon an occurrence of a first edge type in said input clock signal after a first logical level on said first node is provided as said synchronized signal;

inverting a logic value present on a third node and providing an inverted logical value on said third node upon an occurrence of a second edge type in said input clock sign after a second logical level on said first node is provided as said synchronized signal; and performing an XOR operation of bits received on said second node and said third node respectively to generate a logical value at a first node; and sampling said logical value received on said first node at time points specified by one of a first edge type and a second edge type of said sampling clock signal and providing corresponding sampled values as said synchronized signal.

* * * * *